United States Patent

Koga

Patent Number: 5,088,176
Date of Patent: Feb. 18, 1992

[54] APPARATUS FOR AID IN ATTACHING WORK

[75] Inventor: Michitaka Koga, Kumagaya, Japan

[73] Assignee: Fuji Jukogyo Kabushiki Kaisha, Tokyo, Japan

[21] Appl. No.: 660,742

[22] Filed: Feb. 26, 1991

[30] Foreign Application Priority Data

Mar. 16, 1990 [JP] Japan .................. 2-26214[U]

[51] Int. Cl.$^5$ ................ B21D 39/03; B23P 11/00
[52] U.S. Cl. ............................ 29/430; 29/823; 29/824
[58] Field of Search ......... 29/822, 823, 824, 791, 29/795, 429, 430, 831

[56] References Cited

U.S. PATENT DOCUMENTS

| | | | |
|---|---|---|---|
| 4,411,354 | 10/1983 | Thibault et al. | 29/430 X |
| 4,658,501 | 8/1987 | Fujii et al. | 29/824 X |
| 4,723,356 | 2/1988 | Sakamoto et al. | 29/824 X |
| 4,734,979 | 4/1988 | Sakamoto et al. | 29/822 |
| 4,767,046 | 8/1988 | Kumagai et al. | 29/822 X |
| 4,776,085 | 10/1988 | Shiiba | 29/824 |
| 4,894,909 | 1/1990 | Sakamoto et al. | 29/824 X |
| 4,928,386 | 5/1990 | Schupp et al. | 29/824 |

FOREIGN PATENT DOCUMENTS

| | | | |
|---|---|---|---|
| 0295181 | 12/1986 | Japan | 29/430 |
| 0110581 | 5/1987 | Japan | 29/430 |
| 0110582 | 5/1987 | Japan | 29/430 |
| 0130485 | 6/1988 | Japan | 29/430 |

*Primary Examiner*—Timothy V. Eley
*Assistant Examiner*—C. Richard Martin
*Attorney, Agent, or Firm*—Beveridge, DeGrandi & Weilacher

[57] ABSTRACT

In attaching a work to a car body, the work (W) set on a work support unit (9) is positioned relative to the car body (1) in such a way that positioning pins (10) erected on a jig (8) are inserted into gauge holes (1a) formed in a lower surface of the car body (1), whereby an operator can attach the work (W) without carrying it up.

5 Claims, 2 Drawing Sheets

APPARATUS FOR AID IN ATTACHING WORK

BACKGROUND OF THE INVENTION

The present invention relates to an apparatus for aid in attaching a work, which is arranged by the side of an assembly line and which can relieve an attaching job when the work such as a fuel tank is to be attached to a car body.

In case of attaching a work, such as fuel tank, to the lower surface of a car body which is conveyed along an assembly line, it is common practice that an operator sets the work on a lifter disposed under a floor and raises the work, and that he/she attaches the work to the lower surface of the car body which is suspended and conveyed at a predetermined height. Herein, a heavy burden is imposed on the operator for the reasons that the work is a weighty article, for example, that the fuel tank weighs 12–16 kg., and that the attaching job is performed from under the car body. A further drawback is that, since the lifter is disposed under the floor, a sufficient job space is not secured, so lowering in the efficiency of the job is incurred.

As a measure against the drawbacks, there has been proposed a work holding apparatus wherein, as disclosed in the official gazette of Japanese Utility Model Registration Application Laid-open No. 92125/1987, guide rails are laid by the side of the assembly line, a truck is disposed which is moved through the guide of the rails and in synchronism with the car body conveyed along the assembly line, a multiarticulated link motion which can turn horizontally is suspended from the truck, a work holder on which the work to be attached to the car body is placed is provided at the fore end of the multiarticulated link motion, and the work is moved relative to the car body conveyed along the line, thereby to transport the work to the vicinity of the work attachment position of the car body.

With the prior-art example, the work can be moved to the vicinity of the work attachment position by the work holder mounted on the fore end of the multiarticulated link motion which is suspended from the truck moved in synchronism with the movement of the car body conveyed along the assembly line and which is adapted to turn in the horizontal direction. Since, however, the error of the attachment position attributed to the positional deviation of the conveyed car body, etc. develops, the operator must carry up and position the work on each occasion of assemblage and then attach it. This brings about such a disadvantage that a heavy burden is imposed on the operator because the work is the weighty article.

SUMMARY OF THE INVENTION

It is accordingly an object of the present invention to provide an apparatus for aid in attaching a work, with which an operator can attach the work to the lower surface of a car body without carrying it up, with ease even when the work is a weighty article.

The work attachment aid apparatus of the present invention for accomplishing the object comprises an assembly line along which a car body is suspendedly conveyed by a hanger, a truck which is disposed so as to be movable sideways of and along said assembly line, a synchronous motion unit which is installed on said truck and which moves said truck in synchronism with said car body being conveyed, in engagement with said hanger, a pole which is mounted on said truck so as to be horizontally turnable, a jig table which is secured to said pole through a parallel link mechanism so as to be vertically movable, a jig which is installed on said jig table through a position regulation unit so as to be horizontally movable, a work support unit which is installed on said jig and which positions said work so as to be placed on a predetermined position of said jig, positioning pins which are erected on said jig and which are respectively inserted into gauge holes formed in said car body, so as to position said jig relative to said car body, an air cylinder which is spanningly interposed between said pole and said parallel link mechanism and which fulfills a balancing actuator function of holding said jig table in a balanced state in correspondence with a weight of said work, and a rotation driver which drives and rotates said pole horizontally so as to permit said jig table to move between the work placement position and a work attachment position of a lower surface of a car.

At the work placement position, the work is placed and set on the work support unit of the jig installed on the jig table, and the jig table is held in the balanced state by the air cylinder spanningly interposed between the pole and the parallel link mechanism. Next, the synchronous motion unit installed on the truck is brought into engagement with the hanger, to move the truck in synchronism with the car body being conveyed, and the pole is rotated by the rotation driver, to move the jig table to the vicinity of the work attachment position of the lower surface of the car body. Subsequently, the jig borne on the jig table through the position regulation unit is moved horizontally and vertically until the positioning pins are inserted into the gauge holes formed in the lower surface of the car body, whereby the positioning between the work and the work attachment position of the car body is effected. The positioned work is attached to the lower surface of the car body. After the attachment, the jig table is restored to its original position, and the apparatus is caused to stand by.

BRIEF DESCRIPTION OF THE DRAWINGS

FIG. 1 is a front view showing an embodiment of an apparatus for aid in attaching a work in the present invention, while

DESCRIPTION OF THE PREFERRED EMBODIMENT

Now, one embodiment of an apparatus for aid in attaching a work in the present invention will be described with reference to the drawings by exemplifying a fuel tank as the work.

Figure 1:
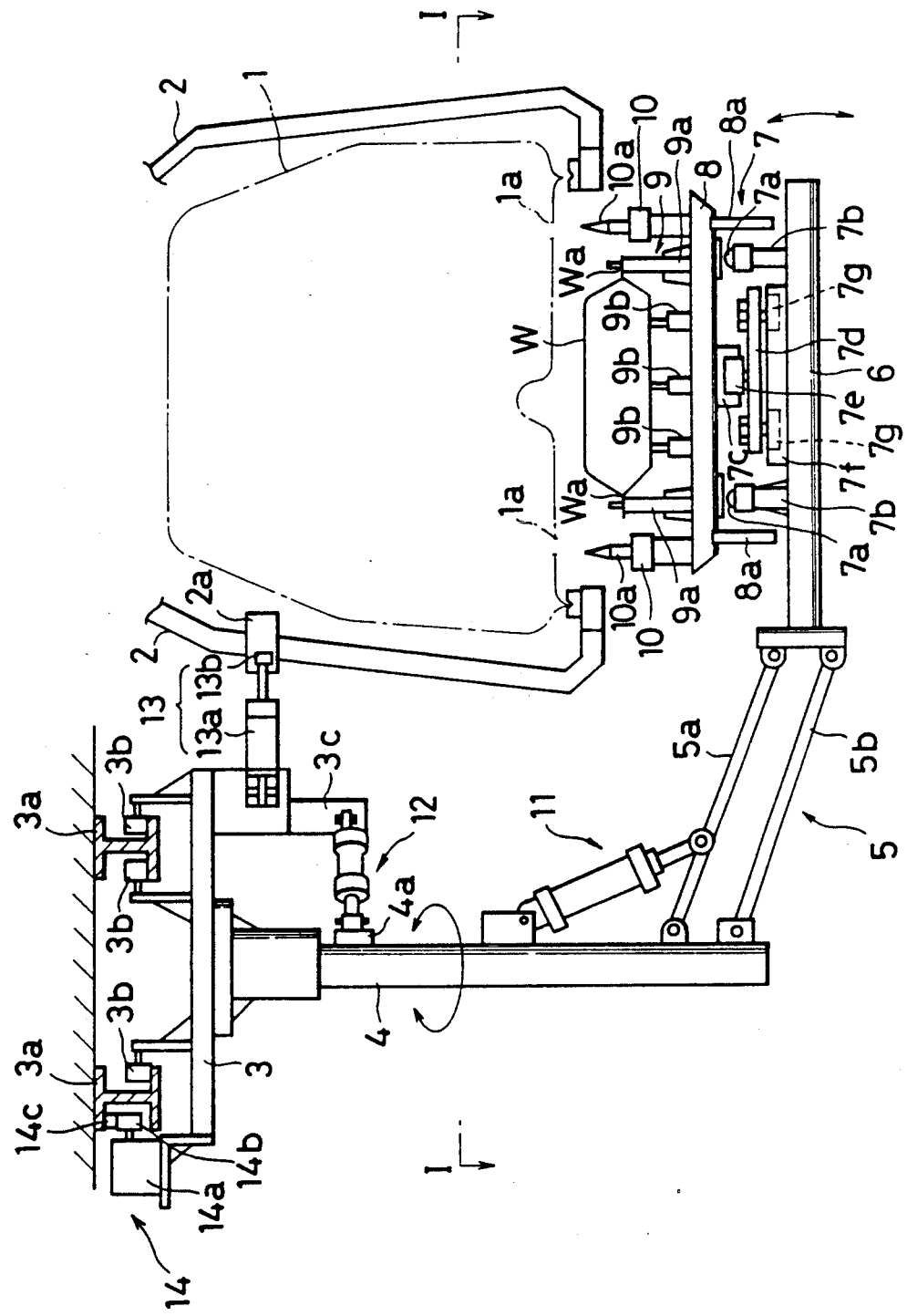
Figure 2B:
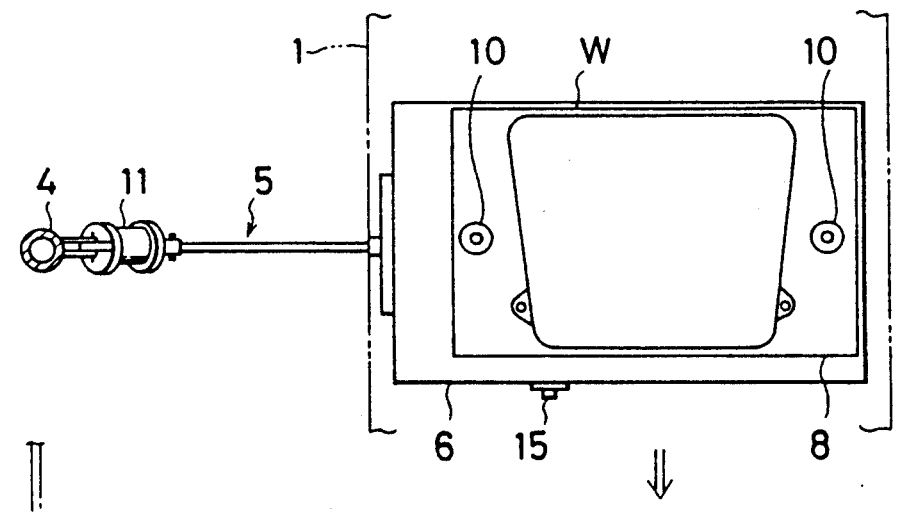
FIG. 2A and FIG. 2B are plan views showing the essential portions of the embodiment.
Figure 2A:
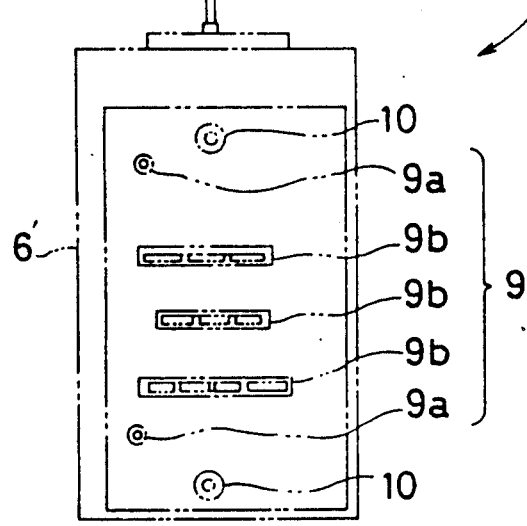

FIG. 1 is a front view of this embodiment, while FIG. 2A and FIG. 2B are plan views showing the outline of the apparatus below a line I—I in FIG. 1.

In the figures, numeral 1 designates a car body, which is suspended through a hanger 2 from a rail (not shown) disposed above and which is conveyed along an assembly line.

A pair of rails 3a, 3a are juxtaposed along the assembly line by the side of this assembly line along which the car body 1 is conveyed. A truck 3 is movably suspended from the rails 3a, 3a through guide rollers 3b, 3b, . . .

A pole 4 is installed under the truck 3 so as to be horizontally turnable, and a rotation driver, for example, air cylinder 12 is spanningly interposed between a bracket 4a mounted on the pole 4 and a bracket 3c mounted on the truck 3, so that the pole 4 is driven and rotated in the horizontal direction by extending and shortening the air cylinder 12.

Further, the truck 3 is furnished with a synchronous motion unit 13 which is configured of an air cylinder 13a, and a protrusive piece 13b that is protracted and retracted by extending and shortening the air cylinder 13a. The truck 3 is moved while being guided by the rails 3a, 3a in synchronism with the movement of the conveyed car body 1, in such a way that the protrusive piece 13b protracted by actuating the air cylinder 13a of the synchronous motion unit 13 is brought into abuttal engagement with an abutting piece 2a mounted on the hanger 2 which is conveyed along the assembly line.

A jig table 6 is installed on the lower part of the pole 4 so as to be vertically translatable, through a parallel link mechanism 5 whose principal constituents are an upper arm 5a and a lower arm 5b.

A jig 8 is installed on the upper surface of the jig table 6 through a position regulation unit 7 so as to be movable within a horizontal plane. The position regulation unit 7 is configured of support portions 7b, 7b, ... which are protrudingly erected on the jig table 6 and which have at their top parts rotatable balls 7a, 7a, ... for supporting the jig 8 from below so as to be movable; a guide 7c which is mounted on the jig 8 in order to guide the jig 8 in parallel with the conveyance direction of the car body 1, as well as a roller 7e which is mounted on an intermediate member 7d so as to roll within the guide 7c; and a guide 7f which is mounted on the jig table 6 in order to guide the jig 8 in a direction orthogonal to the conveyance direction of the car body 1, as well as rollers 7g which are mounted on the intermediate member 7d so as to roll within the guide 7f.

A work support unit 9 is installed on the upper surface of the jig 8, and it is configured of pins 9a, 9a which effect the positioning of the work W relative to the jig 8 with their distal ends inserted through gauge holes Wa, Wa that are provided in the flanges of the fuel tank being the work W, and support members 9b, 9b, ... which support the work W from below. Further, on the upper surface of the jig 8, there are mounted positioning pins 10, 10 having pin portions 10a, 10a which are inserted into gauge holes 1a, 1a provided in the predetermined positions of the car body 1 and which are freely protracted and retracted for the positioning between the car body 1 and the jig 8, and a limit switch (not shown) for changing-over the air pressure of an air cylinder 11 to be described below, which is spanningly interposed between the pole 4 and the parallel link mechanism 5, depending upon the presence or absence of the work W.

The air cylinder 11 interposed between the pole 4 and the parallel link mechanism 5 in spanning fashion, functions as a balancing actuator. When the work W has been placed on the jig 8 by an operator, this air cylinder 11 is adjusted to extend or shorten in adaptation to the weight of the work W, in response to a signal from the unshown limit switch mounted on the jig 8 and having detected the placement, thereby to hold the jig table 6 in a balanced state.

Numeral 14 indicates a retreat motion unit, which moves the truck 3 to the standby position thereof in such a way that a pinion 14b which meshes with a rack 14c mounted on the rail 3a is driven and rotated by a motor 14a which is fixed to the truck 3. Numeral 15 indicates a control switch which is mounted on the jig table 6 in order to actuate this apparatus.

Next, there will be described the operation of the work attachment aid apparatus in this embodiment constructed as stated above.

Referring to FIG. 2, at the work placement position (A) of the jig table 6 as indicated by a two-dot chain line 6', the work W is set on the work support unit 9 provided on the jig 8. By the setting of the work W, the unshown limit switch is actuated so as to feed the air cylinder 11 with air. Then, the air cylinder 11 is adjusted to extend or shorten in adaptation to the weight of the work W until the jig table 6 is brought into its balanced state.

Subsequently, when the car body 1 being conveyed along the assembly line has reached a predetermined position near the work attachment aid apparatus, the entry thereof is acknowledged with a limit switch (not shown) or the like, the air cylinder 13a of the synchronous motion unit 13 is extended in response to a signal from the limit switch, and the protrusive piece 13b is brought into abuttal engagement with the abutting piece 2a of the hanger 2 being conveyed along the assembly line.

Then, the tractive power of the hanger 2 is transmitted to the truck 3 through the synchronous motion unit 13, and the truck 3 begins to move in synchronism with the car body 1 being conveyed along the assembly line, while being guided by the rails 3a, 3a through the guide rollers 3b, 3b, ...

At the same time that the truck 3 has begun to move in synchronism with the car body 1 suspended by the hanger 2, the air cylinder 12 which is the rotation driver is shortened to horizontally rotate the pole 4, whereby the jig table 6 is moved to the vicinity of the work attachment position (B) of the lower surface of the car body 1.

At the next step, the operator grips the handles 8a of the jig 8 and moves the jig 8 on the jig table 6 horizontally and upwards until the pin portions 10a of the positioning pins 10 having already protruded to their ascent positions are inserted into the gauge holes 1a of the car body 1. Thus, the positioning between the work W and the car body 1 is effected. On this occasion, the jig 8 can be easily moved in a predetermined extent within a horizontal plane owing to the position regulation unit 7. Further, since the jig table 6 is held in the balanced state by the air cylinder 11, the pin portions 10a, 10a can be inserted into the gauge holes 1a, 1a very easily, to perform the job of the positioning between the work W and the car body 1.

Under this state, the operator attaches the work W to the lower surface of the car body 1 with bolts etc.

After the completion of the attachment of the work W, on the basis of the control signal of the control switch 15, the pin portions 10a of the positioning pins 10 are drawn in, and besides, the air cylinder 11 is extended to lower the jig table 6, accordingly the jig 8. After the jig table 6 has been lowered to a predetermined position, the air cylinder 12 as the rotation driver is extended to drive and rotate the pole 4, whereby the jig table 6 is withdrawn from the assembly line. Further, the air cylinder 13a of the synchronous motion unit 13 is shortened to release the engagement between the protrusive piece 13b and the abutting piece 2a of the hanger 2, whereby the synchronous transportation of the car body 1 and the truck 3 is ended.

Subsequently, the motor 14a of the retreat motion unit 14 is driven and rotated to retreat the truck 3 by means of the rack 14c and the pinion 14b, whereby the truck 3 is restored to its original position, and the apparatus is caused to stand by till the conveyance of the next car body 1. By repeating such operations, the works are successively attached to the car bodies which are conveyed along the assembly line in succession.

Although, in the above, the case of attaching the fuel tank as the work to the lower surface of the car body has been described as one example, the present invention is also applicable to other components which can be attached to the lower surface of the car body.

According to the work attachment aid apparatus of the present invention as described above, at a work placement position, a work is set on a jig, and a jig table is held in its balanced state by an air cylinder spanningly interposed between a pole and a parallel link mechanism; the jig table is moved to the vicinity of the work attachment position of the lower surface of a car body by a rotation driver while a truck is being moved in synchronism with the car body by a synchronous motion unit; and the jig supported on the jig table is moved horizontally and vertically by a position regulation unit with the balanced state maintained by the air cylinder, so as to insert positioning pins into gauge holes formed in the lower surface of the car body, whereby the positioning between the work and the work attachment position of the car body is executed. Therefore, an operator can conduct a work attaching job without carrying up the work directly, so that the burden of the work attaching job on the operator can be greatly relieved. Another effect is that enhancement in the efficiency of the job can be expected.

What is claimed is:

1. An apparatus for aid in attaching a work; comprising an assembly line along which a car body is suspendedly conveyed by a hanger, a truck which is disposed so as to be movable sideways of and along said assembly line, a synchronous motion unit which is installed on said truck and which moves said truck in synchronism with said car body being conveyed, in engagement with said hanger, a pole which is mounted on said truck so as to be horizontally turnable, a jig table which is secured to said pole through a parallel link mechanism so as to be vertically movable, a jig which is installed on said jig table through a position regulation unit so as to be horizontally movable, a work support unit which is installed on said jig and which positions said work so as to be placed on a predetermined position of said jig, positioning pins which are erected on said jig and which are respectively inserted into gauge holes formed in said car body, so as to position said jig relative to said car body, an air cylinder which is spanningly interposed between said pole and said parallel link mechanism and which fulfills a balancing actuator function of holding said jig table in a balanced state in correspondence with a weight of said work, and a rotation driver which drives and rotates said pole horizontally so as to permit said jig table to move between the work placement position and a work attachment position of a lower surface of a car.

2. An apparatus for aid in attaching a work as defined in claim 1, wherein said synchronous motion unit includes an air cylinder which is mounted on said truck, and a protrusive piece which is protracted and retracted by extending and shortening said air cylinder of said synchronous motion unit.

3. An apparatus for aid in attaching a work as defined in claim 1, wherein said position regulation unit includes support portions which are protrudingly erected on said jig table and which have at their top parts rotatable balls for supporting said jig from below so as to be movable; a first guide which is mounted on said jig in order to guide said jig in parallel with a conveyance direction of said car body, as well as a first roller which is mounted on an intermediate member so as to roll within said first guide; and a second guide which is mounted on said jig table in order to guide said jig in a direction orthogonal to the conveyance direction of said car body, as well as rollers which are mounted on said intermediate member so as to roll within said second guide.

4. An apparatus for aid in attaching a work as defined in claim 1, wherein said work support unit includes support members which are erected on said jig in order to support said work from below, and pins which are erected on said jig and are inserted into gauge holes formed in flanges of said work, in order to position said work relative to said jig.

5. An apparatus for aid in attaching a work as defined in claim 1, wherein said rotation driver includes an air cylinder which is spanningly interposed between said pole and said truck.

* * * * *